US010033642B2

(12) United States Patent
Scott et al.

(10) Patent No.: US 10,033,642 B2
(45) Date of Patent: Jul. 24, 2018

(54) SYSTEM AND METHOD FOR MAKING OPTIMAL ROUTING DECISIONS BASED ON DEVICE-SPECIFIC PARAMETERS IN A CONTENT CENTRIC NETWORK

(71) Applicant: CISCO TECHNOLOGY, INC., San Jose, CA (US)

(72) Inventors: Glenn C. Scott, Portola Valley, CA (US); Priti Goel, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 15/269,732

(22) Filed: Sep. 19, 2016

(65) Prior Publication Data
US 2018/0083877 A1    Mar. 22, 2018

(51) Int. Cl.
*H04L 12/745* (2013.01)
*H04L 12/747* (2013.01)
(Continued)

(52) U.S. Cl.
CPC .......... *H04L 45/748* (2013.01); *H04L 45/742* (2013.01); *H04L 45/00* (2013.01); *H04L 45/54* (2013.01)

(58) Field of Classification Search
CPC ... H04L 67/327; H04L 67/42; H04L 67/1002; H04L 45/306; H04L 45/14; H04L 45/742;
(Continued)

(56) References Cited

U.S. PATENT DOCUMENTS

| 817,441 A | 4/1906 | Niesz |
|---|---|---|
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |

(Continued)

FOREIGN PATENT DOCUMENTS

| DE | 19620817 A1 | 11/1997 |
|---|---|---|
| EP | 0295727 A2 | 12/1988 |

(Continued)

OTHER PUBLICATIONS

International Search Report and Written Opinion in corresponding International Application No. PCT/US2017/051251, dated Nov. 30, 2017, 10 pages.

(Continued)

*Primary Examiner* — Candal Elpenord
*Assistant Examiner* — Ricardo Castaneyra

(57) ABSTRACT

One embodiment provides a system that facilitates optimal forwarding decisions based on device-specific routing parameters. During operation, the system receives, from a transmitting device, an advertisement for a name prefix, wherein the advertisement includes route parameters specific to the transmitting device. The system stores the route parameters based on the name prefix and a first interface associated with the transmitting device. In response to receiving an interest with a name that includes the name prefix, the system obtains a matching entry in a forwarding information base based on the name prefix, wherein the matching entry indicates one or more outgoing interfaces and corresponding route parameters, which include the first interface and the corresponding stored route parameters. The system selects a second interface from the outgoing interfaces based on the route parameters for the outgoing interfaces, and forwards the interest via the selected second interface.

20 Claims, 7 Drawing Sheets

(51) Int. Cl.
*H04L 12/741* (2013.01)
*H04L 12/701* (2013.01)

(58) Field of Classification Search
CPC ....... H04L 45/748; H04L 45/54; H04L 51/14; H04L 12/18; H04L 41/12
See application file for complete search history.

(56) References Cited

U.S. PATENT DOCUMENTS

| | | | |
|---|---|---|---|
| 6,047,331 A | 4/2000 | Medard | |
| 6,052,683 A | 4/2000 | Irwin | |
| 6,085,320 A | 7/2000 | Kaliski, Jr. | |
| 6,091,724 A | 7/2000 | Chandra | |
| 6,128,623 A | 10/2000 | Mattis | |
| 6,128,627 A | 10/2000 | Mattis | |
| 6,173,364 B1 | 1/2001 | Zenchelsky | |
| 6,209,003 B1 | 3/2001 | Mattis | |
| 6,226,618 B1 | 5/2001 | Downs | |
| 6,233,617 B1 | 5/2001 | Rothwein | |
| 6,233,646 B1 | 5/2001 | Hahm | |
| 6,289,358 B1 | 9/2001 | Mattis | |
| 6,292,880 B1 | 9/2001 | Mattis | |
| 6,332,158 B1 | 12/2001 | Risley | |
| 6,363,067 B1 | 3/2002 | Chung | |
| 6,366,988 B1 | 4/2002 | Skiba | |
| 6,574,377 B1 | 6/2003 | Cahill | |
| 6,640,243 B1 * | 10/2003 | Phillips ............. | H04L 29/12009 709/201 |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,732,273 B1 | 5/2004 | Byers | |
| 6,769,066 B1 | 7/2004 | Botros | |
| 6,772,333 B1 | 8/2004 | Brendel | |
| 6,775,258 B1 | 8/2004 | vanValkenburg | |
| 6,862,280 B1 | 3/2005 | Bertagna | |
| 6,901,452 B1 | 5/2005 | Bertagna | |
| 6,915,307 B1 | 7/2005 | Mattis | |
| 6,917,985 B2 | 7/2005 | Madruga | |
| 6,957,228 B1 | 10/2005 | Graser | |
| 6,968,393 B1 | 11/2005 | Chen | |
| 6,981,029 B1 | 12/2005 | Menditto | |
| 7,007,024 B2 | 2/2006 | Zelenka | |
| 7,013,389 B1 | 3/2006 | Srivastava | |
| 7,031,308 B2 | 4/2006 | Garcia-Luna-Aceves | |
| 7,043,637 B2 | 5/2006 | Bolosky | |
| 7,061,877 B1 | 6/2006 | Gummalla | |
| 7,080,073 B1 | 7/2006 | Jiang | |
| RE39,360 E | 10/2006 | Aziz | |
| 7,149,750 B2 | 12/2006 | Chadwick | |
| 7,152,094 B1 | 12/2006 | Jannu | |
| 7,177,646 B2 | 2/2007 | ONeill | |
| 7,206,860 B2 | 4/2007 | Murakami | |
| 7,206,861 B1 | 4/2007 | Callon | |
| 7,210,326 B2 | 5/2007 | Kawamoto | |
| 7,246,159 B2 | 7/2007 | Aggarwal | |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,362,727 B1 | 4/2008 | ONeill | |
| 7,382,787 B1 | 6/2008 | Barnes | |
| 7,395,507 B2 | 7/2008 | Robarts | |
| 7,430,755 B1 | 9/2008 | Hughes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,542,471 B2 | 6/2009 | Samuels | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,564,812 B1 | 7/2009 | Elliott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,636,767 B2 | 12/2009 | Lev-Ran | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,698,559 B1 | 4/2010 | Chaudhury | |
| 7,769,887 B1 | 8/2010 | Bhattacharyya | |
| 7,779,467 B2 | 8/2010 | Choi | |
| 7,801,069 B2 | 9/2010 | Cheung | |
| 7,801,177 B2 | 9/2010 | Luss | |
| 7,816,441 B2 | 10/2010 | Elizalde | |
| 7,831,733 B2 | 11/2010 | Sultan | |
| 7,873,619 B1 | 1/2011 | Faibish | |
| 7,908,337 B2 | 3/2011 | Garcia-Luna-Aceves | |
| 7,924,837 B1 | 4/2011 | Shabtay | |
| 7,953,014 B2 | 5/2011 | Toda | |
| 7,953,885 B1 | 5/2011 | Devireddy | |
| 7,979,912 B1 | 7/2011 | Roka | |
| 8,000,267 B2 | 8/2011 | Solis | |
| 8,010,691 B2 | 8/2011 | Kollmansberger | |
| 8,069,023 B1 | 11/2011 | Frailong | |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,271,578 B2 | 9/2012 | Sheffi | |
| 8,271,687 B2 | 9/2012 | Turner | |
| 8,312,064 B1 | 11/2012 | Gauvin | |
| 8,332,357 B1 | 12/2012 | Chung | |
| 8,386,622 B2 | 2/2013 | Jacobson | |
| 8,447,851 B1 | 5/2013 | Anderson | |
| 8,462,781 B2 | 6/2013 | McGhee | |
| 8,467,297 B2 | 6/2013 | Liu | |
| 8,473,633 B2 | 6/2013 | Eardley | |
| 8,553,562 B2 | 10/2013 | Allan | |
| 8,572,214 B2 | 10/2013 | Garcia-Luna-Aceves | |
| 8,654,649 B2 | 2/2014 | Vasseur | |
| 8,665,757 B2 | 3/2014 | Kling | |
| 8,667,172 B2 | 3/2014 | Ravindran | |
| 8,677,451 B1 | 3/2014 | Bhimaraju | |
| 8,688,619 B1 | 4/2014 | Ezick | |
| 8,699,350 B1 | 4/2014 | Kumar | |
| 8,718,055 B2 | 5/2014 | Vasseur | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,861,356 B2 | 10/2014 | Kozat | |
| 8,862,774 B2 | 10/2014 | Vasseur | |
| 8,868,779 B2 | 10/2014 | ONeill | |
| 8,874,842 B1 | 10/2014 | Kimmel | |
| 8,880,682 B2 | 11/2014 | Bishop | |
| 8,903,756 B2 | 12/2014 | Zhao | |
| 8,923,293 B2 | 12/2014 | Jacobson | |
| 8,934,496 B2 | 1/2015 | Vasseur | |
| 8,937,865 B1 | 1/2015 | Kumar | |
| 8,972,969 B2 | 3/2015 | Gaither | |
| 8,977,596 B2 | 3/2015 | Montulli | |
| 9,002,921 B2 | 4/2015 | Westphal | |
| 9,032,095 B1 | 5/2015 | Traina | |
| 9,071,498 B2 | 6/2015 | Beser | |
| 9,112,895 B1 | 8/2015 | Lin | |
| 9,137,152 B2 | 9/2015 | Xie | |

(56) References Cited

U.S. PATENT DOCUMENTS

| | | |
|---|---|---|
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |

(56) References Cited

U.S. PATENT DOCUMENTS

| | | |
|---|---|---|
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0012260 A1* | 1/2013 | Salkintzis ............. H04W 48/08 455/550.1 |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |

(56) References Cited

U.S. PATENT DOCUMENTS

| | | |
|---|---|---|
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0350078 A1 | 12/2015 | Azgin et al. |
| 2015/0372903 A1 | 12/2015 | Hui |
| 2015/0381546 A1 | 12/2015 | Mahadevan |
| 2016/0014027 A1 | 1/2016 | Oran et al. |
| 2016/0019275 A1 | 1/2016 | Mosko |
| 2016/0021172 A1 | 1/2016 | Mahadevan |
| 2016/0043960 A1* | 2/2016 | Solis .................. H04L 67/10 709/223 |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2983340 A1 | 2/2016 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2012077073 A1 | 6/2012 |

(56) References Cited

FOREIGN PATENT DOCUMENTS

| WO | 2013123410 | 8/2013 |
|---|---|---|
| WO | 2015084327 | 6/2015 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc.downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heal pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.

(56) References Cited

OTHER PUBLICATIONS

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

(56) References Cited

OTHER PUBLICATIONS

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans. on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazine, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

(56) References Cited

OTHER PUBLICATIONS

J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2 %20CCNx%201.0%20Tutorial.pdf [retrieved on Jun. 8, 2016] *paragraphs [003]-[006], [0011], [0013]* * figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.

* cited by examiner

SYSTEM AND METHOD FOR MAKING OPTIMAL ROUTING DECISIONS BASED ON DEVICE-SPECIFIC PARAMETERS IN A CONTENT CENTRIC NETWORK

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/579,925, entitled "SYSTEM AND METHOD FOR EFFICIENT NAME-BASED CONTENT ROUTING USING LINK-STATE INFORMATION IN INFORMATION-CENTRIC NETWORKS," by inventor Jose J. Garcia-Luna-Aceves, filed 22 Dec. 2014 (hereinafter "U.S. patent application Ser. No. 14/579,925"); the disclosures of which are herein incorporated by reference in their entirety.

BACKGROUND

Field

This disclosure is generally related to distribution of digital content. More specifically, this disclosure is related to a system and method for making optimal routing decisions based on device-specific parameters in a content centric network.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

A CCN packet is routed based on its unique name (i.e., name-based routing). In contrast, an Internet Protocol (IP) packet is typically routed using either a distance-based (such as hop count) or a link-based method. IP routing algorithms can use various parameters to determine the best route to forward IP packets. An IP router can use these parameters to calculate a routing metric (which determines the best route to forward an IP packet) for the IP packet to reach its destination. Example of these parameters include path length, reliability, delay, load, and cost. Various IP protocols may use different parameters and algorithms to calculate the routing metric. While the same parameters may be applied to name-based routing protocols such as CCN, the use of these parameters to calculate the routing metric in CCN does not account for additional parameters which are available in CCN and may optimize routing in CCN.

SUMMARY

One embodiment provides a system that facilitates optimal forwarding decisions based on device-specific routing parameters. During operation, the system receives, from a transmitting device, an advertisement for a name prefix, wherein the advertisement includes route parameters specific to the transmitting device. The system stores the route parameters based on the name prefix and a first interface associated with the transmitting device. In response to receiving an interest with a name that includes the name prefix, the system obtains a matching entry in a forwarding information base based on the name prefix, wherein the matching entry indicates one or more outgoing interfaces and corresponding route parameters, which include the first interface and the corresponding stored route parameters. The system selects a second interface from the outgoing interfaces based on the route parameters for the outgoing interfaces. The system forwards the interest via the selected second interface, thereby facilitating optimal forwarding decisions based on the route parameters specific to the transmitting device.

In some embodiments, the route parameters include one or more of: a total capacity of a cache of the transmitting device; and an available capacity of a cache of the transmitting device, wherein the total capacity and the available capacity are one or more of an absolute value and a relative value, wherein the relative value is agreed upon in a network.

In some embodiments, the route parameters include a size of a pending interest table of the transmitting device, wherein the size of the pending interest table is one or more of an absolute value and a relative value, wherein the relative value is agreed upon in a network.

In some embodiments, the route parameters include an indicator of a capacity of the transmitting device to participate in processing data packets, wherein the indicator is one or more of an absolute value and a relative value, wherein the relative value is agreed upon in a network.

In some embodiments, the indicator of the capacity to participate is based on one or more of: a size of a table which tracks labels instead of pending interests; a lack of a pending interest table; a calculation of the transmitting device; and a characteristic or policy of the transmitting device.

In some embodiments, the route parameters include a size of a forwarding information base of the transmitting device, wherein the size of the forwarding information base is one or more of an absolute value and a relative value, wherein the relative value is agreed upon in a network.

In some embodiments, selecting the second interface is further based on performing a path selection algorithm based on the route parameters for the outgoing interfaces.

In some embodiments, the transmitting device is adjacent to the computer system. The route parameters are stored in a forwarding information base, and the route parameters are indicated in the advertisement based on one or more of: a predetermined order; and a label or a field for each of the route parameters.

Another embodiment provides a system that facilitates optimal forwarding decisions based on device-specific routing parameters. During operation, the system generates an advertisement for a name prefix, wherein the advertisement includes route parameters which are specific to the computer system. The system transmits the advertisement to one or more adjacent computing devices. The system receives, from one of the adjacent computing devices, an interest with a name that includes the name prefix, wherein the interest is transmitted based on route parameters included in the advertisement for the name prefix. The system transmits a content object responsive to the interest, thereby facilitating optimal forwarding decisions based on the routing parameters specific to the computer system.

BRIEF DESCRIPTION OF THE FIGURES

In the figures, like reference numerals refer to the same figure elements.

DETAILED DESCRIPTION

Figure 1A:
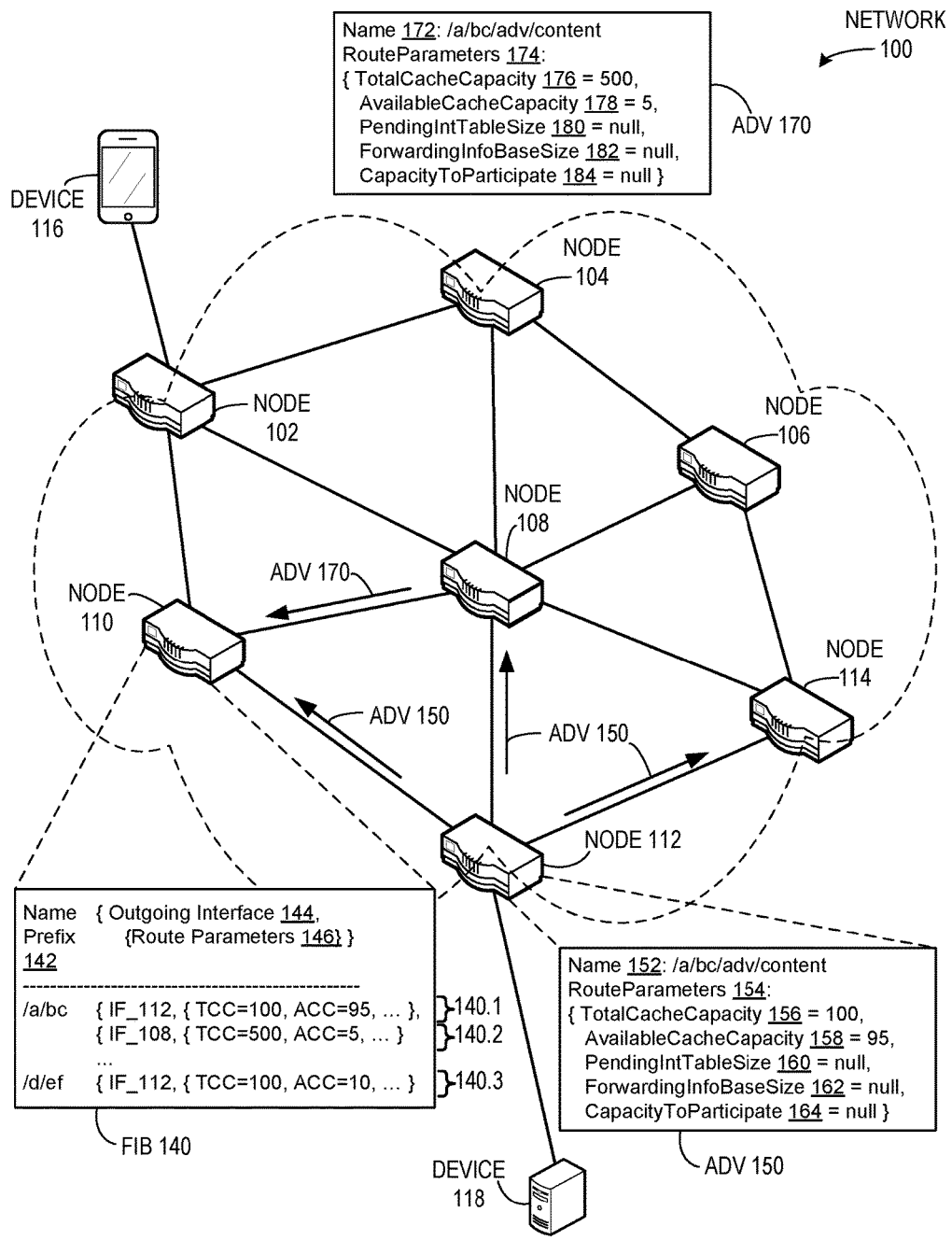
FIG. 1A illustrates an exemplary network which facilitates optimal routing decisions based on device-specific routing parameters, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system in which routers can make optimal routing decisions based on device-specific parameters of other network devices. A CCN packet is routed based on its unique name, whereas an IP packet is typically routed using either distance-based or link-based methods. IP routing algorithms can use various parameters (such as hop count, path length, reliability, delay, load, and cost) to calculate a routing metric, which determines the best route to forward an IP packet. While name-based routing protocols such as CCN can use similar parameters (as in U.S. patent application Ser. No. 14/579,925), additional parameters exist in CCN which may optimize routing in CCN.

Embodiments of the present system allow a node to include a vector of CCN-specific parameters (referred to herein as "CCN route parameters" or "route parameters") in an advertisement for a name prefix, and to transmit the advertisement to at least its adjacent neighbor nodes. A node or device that receives the advertisement can store the route parameters (e.g., in its forwarding information base). When making a decision on how to subsequently route a packet with the name prefix, the receiving node can apply a path selection algorithm based on the route parameters to select the optimal route. Transmitting advertisements and storing route parameters is described in detail below in relation to FIGS. 1A, 3A, and 4, and making optimal routing decisions based on the stored route parameters is described in detail below in relation to FIGS. 1B, 3A, and 3B.

CCN route parameters are specific to a device or a node, which is in contrast to the parameters that are specific to a link, as in IP. CCN route parameters can include a total cache capacity, a free or available cache capacity, a size of a pending interest table (PIT), a size of a forwarding information base (FIB), and an indicator of the capacity of the device to participate in network traffic.

The total cache capacity ("TCC") can be the total amount of memory that a device has for caching content, while the available cache capacity ("ACC") can be the currently available amount of memory that a device has for caching content. A higher value can indicate that the device has a large total or available cache capacity, which may be preferred in route selection, while a lower value can indicate that the device has a small total or available cache capacity, which may be less preferred. TCC and ACC may be measured in capacity units as an absolute number, or as a relative value where the relative value is agreed upon in the network.

The PIT size ("PSZ") can indicate the number of PIT entries present, while the FIB size ("FSZ") can indicate the number of FIB entries present. A higher value can indicate that the device has a large number of PIT or FIB entries, where a lookup into the PIT or FIB may potentially take more time, which can increase latency. A lower value can indicate that the device has a small number of PIT or FIB entries, where a lookup in the PIT or FIB may potentially take less time, which can decrease latency. PSZ and FSZ may be measured in capacity units as an absolute number, or as a relative value where the relative value is agreed upon in the network.

The indicator of the capacity of the device to participate in network traffic ("CTP") can be based on various factors. One example can include a system that does not include pending interest tables (e.g., a PIT-less CCN), and instead uses a table such as in a label swapping model. The CTP can be the size of the table. A higher value can indicate that the table has filled up quickly and cannot accommodate more entries, which may be less preferred in route selection by a receiving device. Other examples of the CTP may depend upon device-specific scheduling policies, specific congestion-detection mechanisms by the device, or other device-specific characteristics or calculations. As with the other route parameters (TCC, ACC, PSZ, and FSZ), CTP may be measured in capacity units as an absolute number, or as a relative value where the relative value is agreed upon in the network.

Thus, the present system provides improvements to the distribution of digital content, where the improvements are fundamentally technological. Embodiments of the present invention provide a technological solution (e.g., providing device-specific route parameters via advertisements for a name prefix to allow receiving devices to make optimal routing decisions for packets under that name prefix based on the known route parameters of other nodes) to the technological problem of the efficient, secure, and effective distribution of digital content.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level, and a name prefix can be one or more of the contiguous name components beginning from the most general level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

Face or Interface (or "face" or "interface"): In CCN, the term "face" is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the terms "face" and "interface," referring to an incoming or outgoing interface of an Interest.

"Prefix": In this disclosure, the term "prefix" can be used to refer to either a name of a specific content object or a name prefix for the content object. A routable name prefix can determine the routing of a packet that indicates a request for a piece of data, and includes a name (or a name prefix) for the piece of data. A data consumer can disseminate a request or interest across an information-centric network, which CCN/NDN routers can propagate toward a storage device (e.g., a cache server) or a data producer that can provide the requested data to satisfy the request or interest.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1A illustrates an exemplary network 100 which facilitates optimal routing decisions based on device-specific routing parameters, in accordance with an embodiment of the present invention. Network 100 can include a consumer or content requesting device 116, a producer or content producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Network 100 can be a content centric network.

During operation, a node can advertise a specific name prefix, which indicates that the node can satisfy requests for content with the advertised name prefix. The node can include in the advertisement a vector of the CCN route parameters specific to the node. For example, node 112 can generate an advertisement 150 with a name 152 of "/a/bc/adv/content," and a route parameters 154 field (or a vector or a tuple) that includes a total cache capacity 156 with a value of "100," an available cache capacity 158 with a value of "95," a pending interest table size 160 with a null value, a forwarding information base size 162 with a null value, and an indicator of a capacity to participate 164 with a null value. Node 112 can transmit advertisement 150 to the network, and advertisement 150 can reach each of adjacent nodes 110, 108, and 114.

A node which receives an advertisement with route parameters can update its forwarding information base (FIB) to include the route parameters for the name prefix. For example, node 110 can receive advertisement 150, and update its FIB 140 to include route parameters 154 of advertisement 150. FIB 140 can include entries with a name prefix 142 and a list comprised of multiple tuples, which comprise an outgoing interface 144 and corresponding route parameters 146. Node 110 can create a new entry 140.1 for the name prefix "/a/bc," and include as an outgoing interface the interface from which advertisement 150 is received (i.e., "IF_112"). Node 110 can also include route parameters 154 as corresponding to outgoing interface IF_112. Note that if an entry for the name prefix "a/bc" already exists in FIB 140, node 110 can update the existing entry by adding the appropriate outgoing interface and corresponding route parameters.

A FIB can include multiple tuples, where a tuple is comprised of an outgoing interface and corresponding route parameters. For example, node 108 can generate and transmit to node 110 an advertisement 170 with a name 172 of "/a/bc/adv/content," and a route parameters 174 field that includes a total cache capacity 176 with a value of "500," an available cache capacity 178 with a value of "5," a pending interest table size 180 with a null value, a forwarding information base size 182 with a null value, and an indicator of a capacity to participate 184 with a null value. Node 110 can receive advertisement 170 and update existing FIB entry 140.1 by adding the tuple 140.2 with an outgoing interface of "IF_108" and route parameters 174 as corresponding to IF_108. FIB 140 can also include other entries for other name prefixes, such as an entry 140.3 for a name prefix "/d/ef" with an outgoing interface of "IF_112" and corresponding route parameters.

Figure 1B:
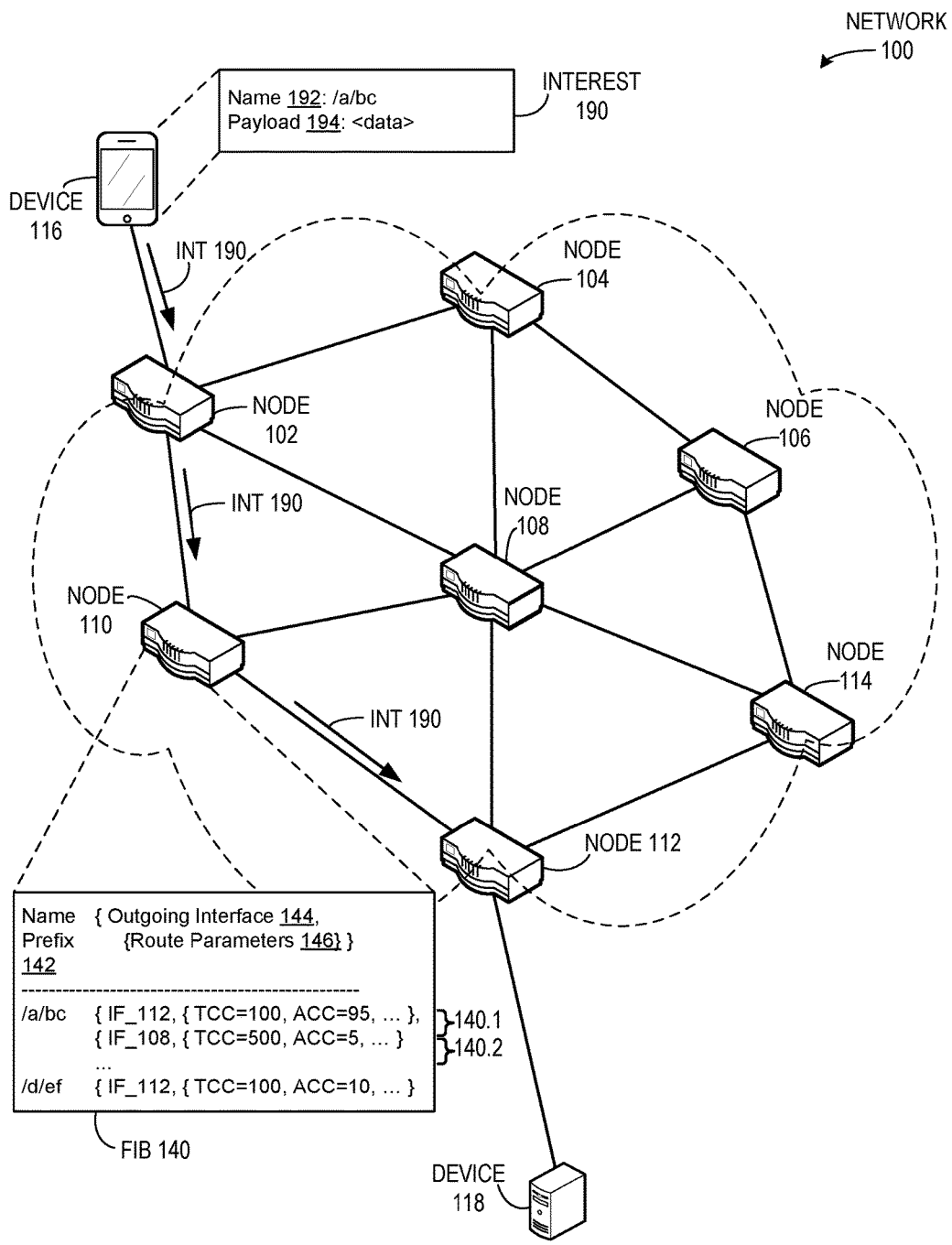
FIG. 1B illustrates an exemplary network which facilitates optimal routing decisions based on device-specific routing parameters, in accordance with an embodiment of the present invention.

FIG. 1B illustrates an exemplary network 100 which facilitates optimal routing decisions based on device-specific routing parameters, in accordance with an embodiment of the present invention. During operation, device 116 can generate an interest 190 with a name 192 of "/a/bc" and an optional payload 194 of "<data>." Interest 190 can travel through network 100, where each intermediate node can make a forwarding decision for interest 190 based on the device-specific route parameters previously received from advertisements (e.g., via a routing protocol) and stored in the FIB of a respective node. For example, node 110 can receive interest 190 and perform a lookup in FIB 140 based on a longest prefix match to obtain the matching FIB entry (which includes tuples 140.1 and 140.2 comprised of outgoing interfaces and corresponding route parameters). Node 110 can determine the outgoing interfaces (i.e., IF_112 and IF_108) listed in the matching FIB entry, and also determine the corresponding route parameters for each outgoing interface (i.e., as shown in the route parameters indicated in each of tuples 140.1 and 140.2). Node 110 can select one or more of the determined outgoing interfaces by performing a path selection algorithm based on the route parameters corresponding to the outgoing interfaces. The path selection algorithm can take into account one or more of the indicated route parameters. For example, one path algorithm may return IF_112 because a ratio of 95 available cache capacity to 100 total cache capacity is more important than a ratio of 5 available cache capacity to 500 total cache capacity. Node 110 can then forward interest 190 via the selected outgoing interface (e.g., via IF_112). On the other hand, if the path selection algorithm places a higher priority on the actual total cache capacity, the path selection algorithm may return IF_108, and node 110 can forward interest 190 via IF_108 (not shown). The path selection algorithm may also select multiple interfaces, and thus may determine to forward interest 190 on both of interfaces IF_112 and IF_108.

Note that some of the route parameters may include a null value. The path selection algorithm can take into account whatever values are stored in the corresponding FIB entry. As described above, all of the values can be either an absolute value (e.g., capacity units) or a relative value which is agreed upon in the network (e.g., a value of 3 where the agreed-upon relative value is in a range from 0-10).

Exemplary Interests/Advertisements and Forwarding Information Bases

Figure 2A:
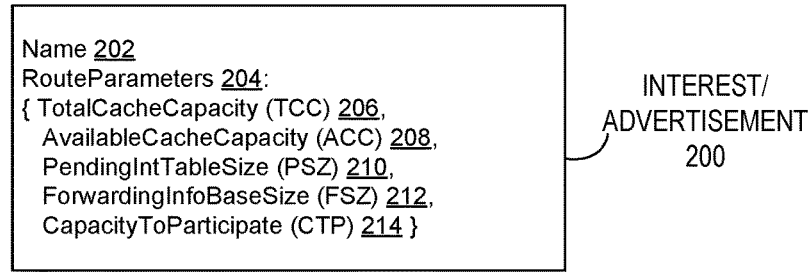
FIG. 2A illustrates an exemplary format for an interest or advertisement which includes device-specific routing parameters, in accordance with an embodiment of the present invention.

FIG. 2A illustrates an exemplary format for an interest or advertisement 200 which includes device-specific routing parameters, in accordance with an embodiment of the present invention. Advertisement 200 can include a name 202 and route parameters 204, which include a total cache capacity (TCC) 206, an available cache capacity (ACC) 208, a pending interest table size (PSZ) 210, a forwarding information base size (FSZ) 212, and an indicator of a capacity to participate in network traffic (CTP) 214. Each of specific route parameters 206, 208, 210, 212, and 214 can be either an absolute value or a relative value which is agreed upon in the network.

Figure 2B:
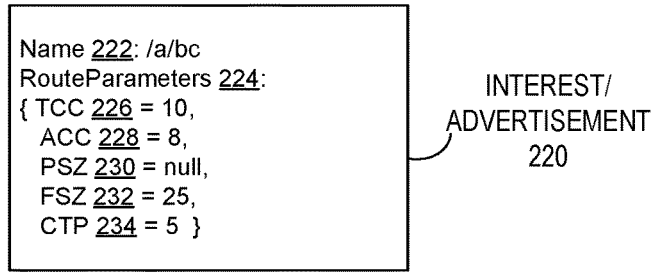
FIG. 2B illustrates an exemplary interest or advertisement which includes device-specific routing parameters, in accordance with an embodiment of the present invention.

FIG. 2B illustrates an exemplary interest or advertisement 220 which includes device-specific routing parameters, in accordance with an embodiment of the present invention. Advertisement 220 can include a name 222 with a value of "/a/bc," and route parameters 224, which include a TCC 226 with a value of "10," an ACC 228 with a value of "8," a PSZ 230 with a null value, an FSZ 232 with a value of "25," and a CTP 234 with a value of "5."

Figure 2C:
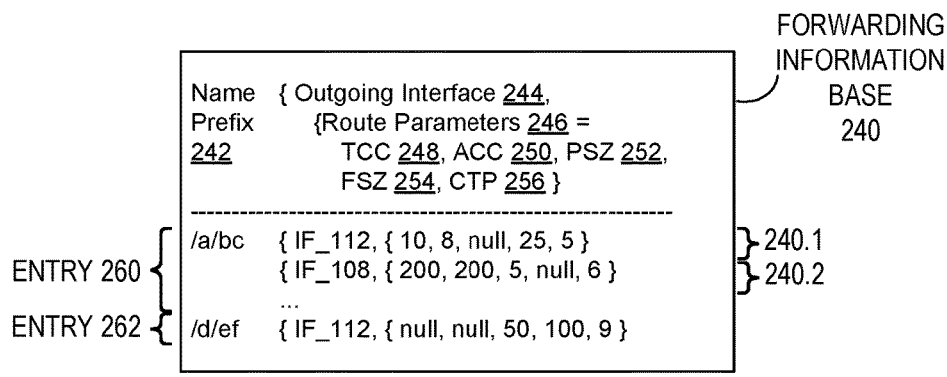
FIG. 2C illustrates an exemplary forwarding information base updated based on the exemplary interest or advertisement of FIG. 2B, in accordance with an embodiment of the present invention.

FIG. 2C illustrates an exemplary forwarding information base 240 updated based on exemplary interest or advertisement 220 of FIG. 2B, in accordance with an embodiment of the present invention. FIB 240 can include entries with a name prefix 242 and tuples comprised of an outgoing interface 244 and route parameters 246, which include a TCC 248, an ACC 250, a PSZ 252, an FSZ 254, and a CTP 256. For example, FIB 240 can include an entry 260 with a name prefix of "/a/bc," and tuples 240.1 and 240.2. Tuple 240.1 can include an outgoing interface of "IF_112" and route parameters {TCC, ACC, PSZ, FSZ, CTP} with values of {10, 8, null, 25, 5}. Tuple 240.2 can include an outgoing interface of "IF_108" and route parameters {TCC, ACC, PSZ, FSZ, CTP} with values of {200, 200, 5, null, 6}. FIB 240 can also include an entry 262 with a name prefix of "/d/ef" and route parameters {TCC, ACC, PSZ, FSZ, CTP} with values of {null, null, 50, 100, 9}.

Intermediate Router Facilitates Optimal Routing Decisions

Figure 3A:
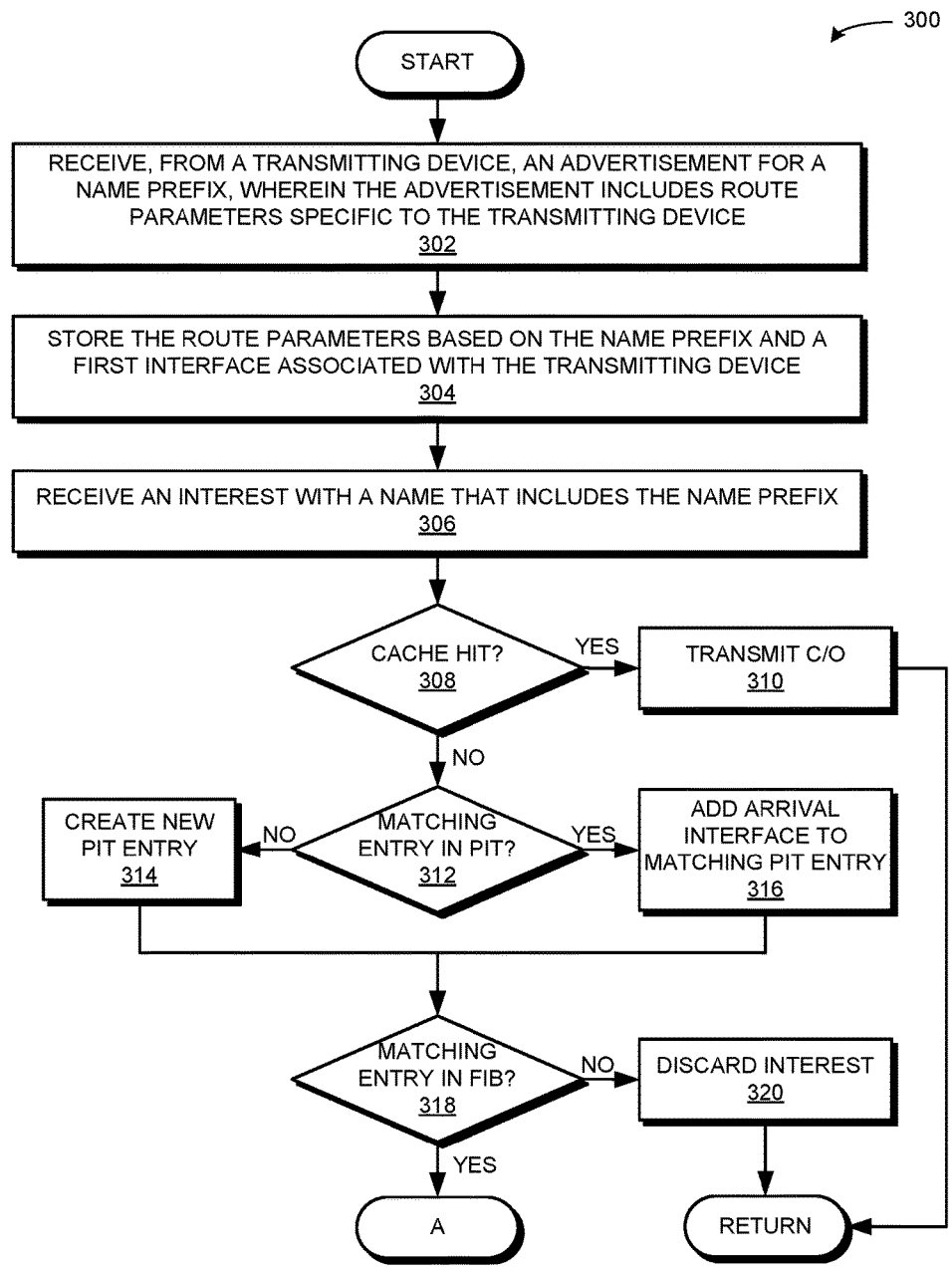
FIG. 3A presents a flow chart illustrating a method by an intermediate router for facilitating optimal routing decisions based on device-specific routing parameters, in accordance with an embodiment of the present invention.

FIG. 3A presents a flow chart 300 illustrating a method by an intermediate router for facilitating optimal routing decisions based on device-specific routing parameters, in accordance with an embodiment of the present invention. During operation, a system receives, by a computing device from a transmitting device, an advertisement for a name prefix, wherein the advertisement includes route parameters specific to the transmitting device (operation 302). The system stores the route parameters based on the name prefix and a first interface associated with the transmitting device (operation 304). The route parameters can be stored in a forwarding information base of the computing device based on the name prefix. The route parameters can further be stored as a tuple in a FIB entry corresponding to an outgoing interface which is the interface from which an advertisement for the route parameters was previously received from the transmitting device.

Subsequently, the system receives an interest with a name that includes the name prefix (operation 306). If the system determines that a responsive content object exists in its local cache (i.e., a cache hit) (decision 308), the system transmits the responsive content object (operation 310) and the operation returns. The system can transmit the responsive content object via the interface from which the interest is received. If the system determines that no responsive content object exists in its local cache (i.e., no cache hit) (decision 308), the system determines whether a matching entry exists in the PIT (decision 312), based on the name of the interest. If no matching entry exists in the PIT (decision 312), the system creates a new PIT entry based on the interest name (operation 314). If a matching entry does exist in the PIT (decision 312), the system adds the arrival interface of the interest to the existing PIT entry (operation 316). The system can also perform aggregation procedures and other PIT-related procedures.

The system determines whether a matching entry exists in the FIB based on a longest prefix match for the name (which includes the name prefix) (decision 318). If no matching entry exists in the FIB (decision 318), the system discards the interest (operation 320) and the operation returns. If a matching entry does exist in the FIB (decision 318), the operation continues as described at Label A of FIG. 3B.

Figure 3B:
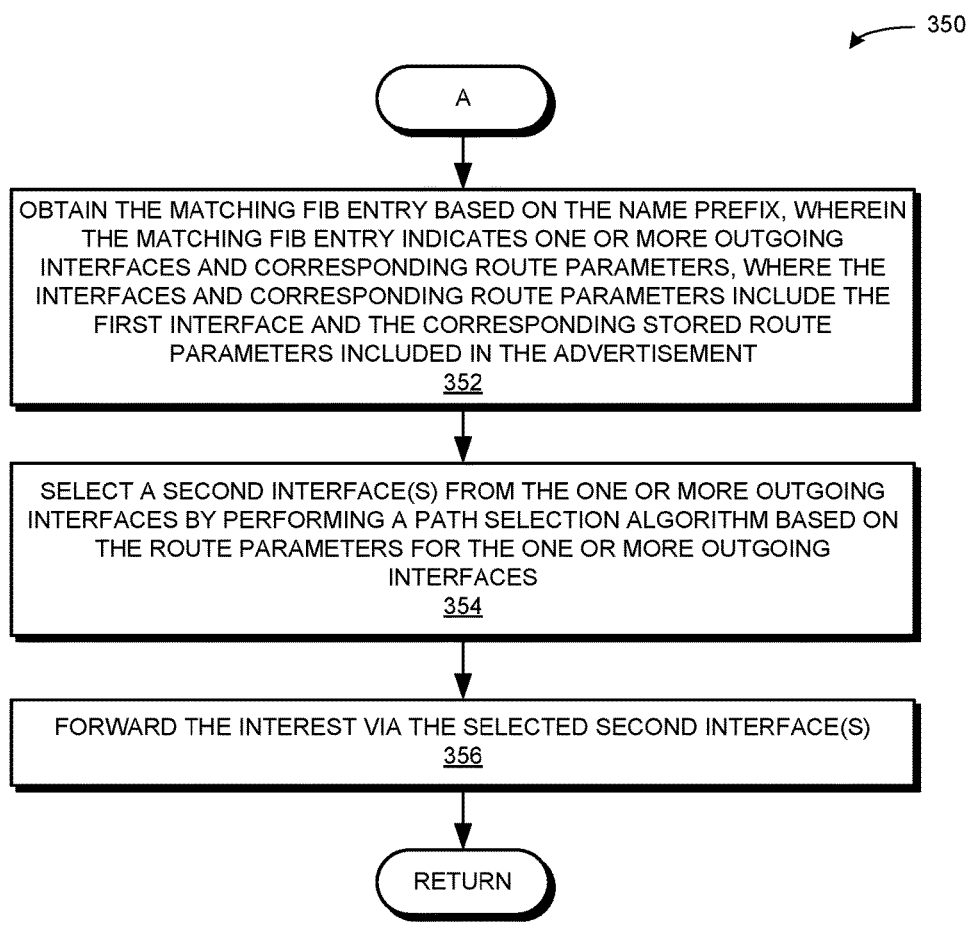
FIG. 3B presents a flow chart illustrating a method by an intermediate router for facilitating optimal routing decisions based on device-specific routing parameters, in accordance with an embodiment of the present invention.

FIG. 3B presents a flow chart 350 illustrating a method by an intermediate router for facilitating optimal routing decisions based on device-specific routing parameters, in accordance with an embodiment of the present invention. During operation, the system obtains the matching FIB entry based on the name prefix, wherein the matching FIB entry indicates one or more outgoing interfaces and corresponding route parameters, where the interfaces and corresponding route parameters include the first interface and the corresponding stored route parameters included in the advertisement (operation 352). The system selects a second interface(s) from the one or more outgoing interfaces by performing a path selection algorithm based on the route parameters for the one or more outgoing interfaces (operation 354). The system forwards the interest via the selected second interface(s) (operation 356).

Transmitting Device Facilitates Optimal Routing Decisions

Figure 4:
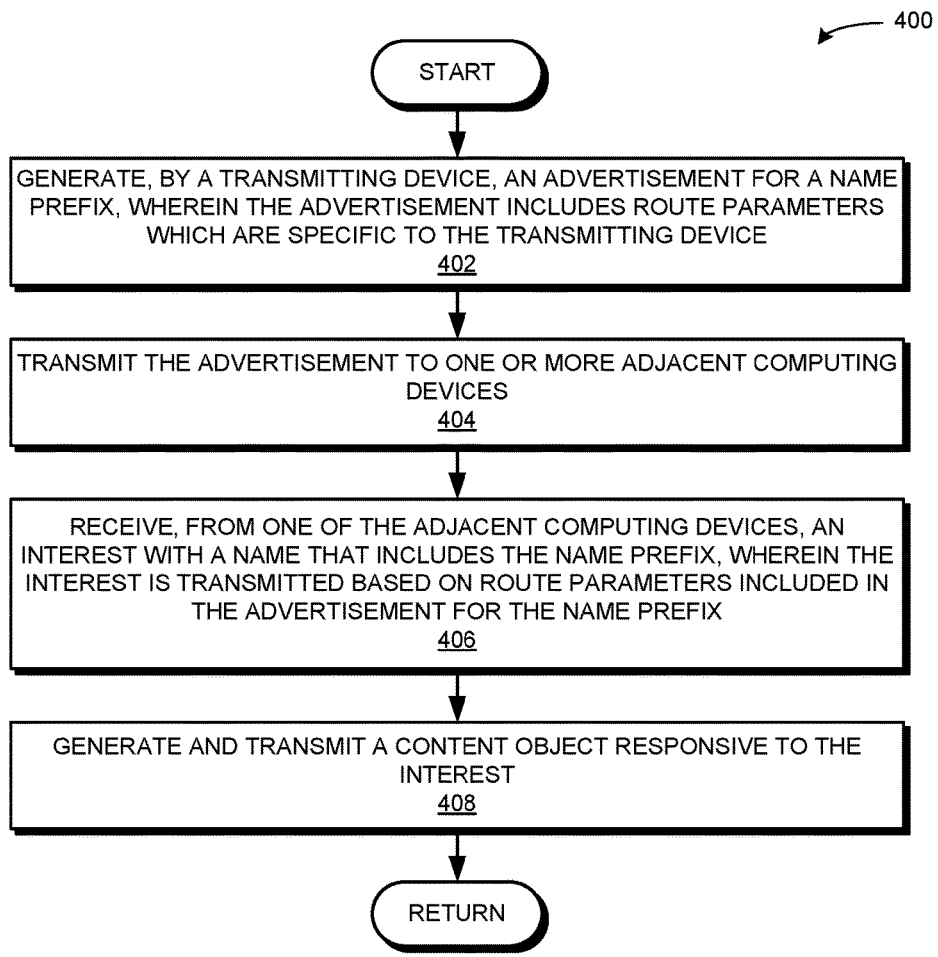
FIG. 4 presents a flow chart illustrating a method by a transmitting device for facilitating optimal routing decisions based on device-specific routing parameters, in accordance with an embodiment of the present invention.

FIG. 4 presents a flow chart 400 illustrating a method by a transmitting device for facilitating optimal routing decisions based on device-specific routing parameters, in accordance with an embodiment of the present invention. The system generates, by a transmitting device, an advertisement for a name prefix, wherein the advertisement includes route parameters which are specific to the transmitting device (operation 402). The system transmits the advertisement to one or more adjacent computing devices (operation 404). The system receives, from one of the adjacent computing devices, an interest with a name that includes the name prefix, wherein the interest is transmitted based on route parameters included in the advertisement for the name prefix (operation 406). The system generates and transmits a content object responsive to the interest (operation 408).

Exemplary Computer System

Figure 5:
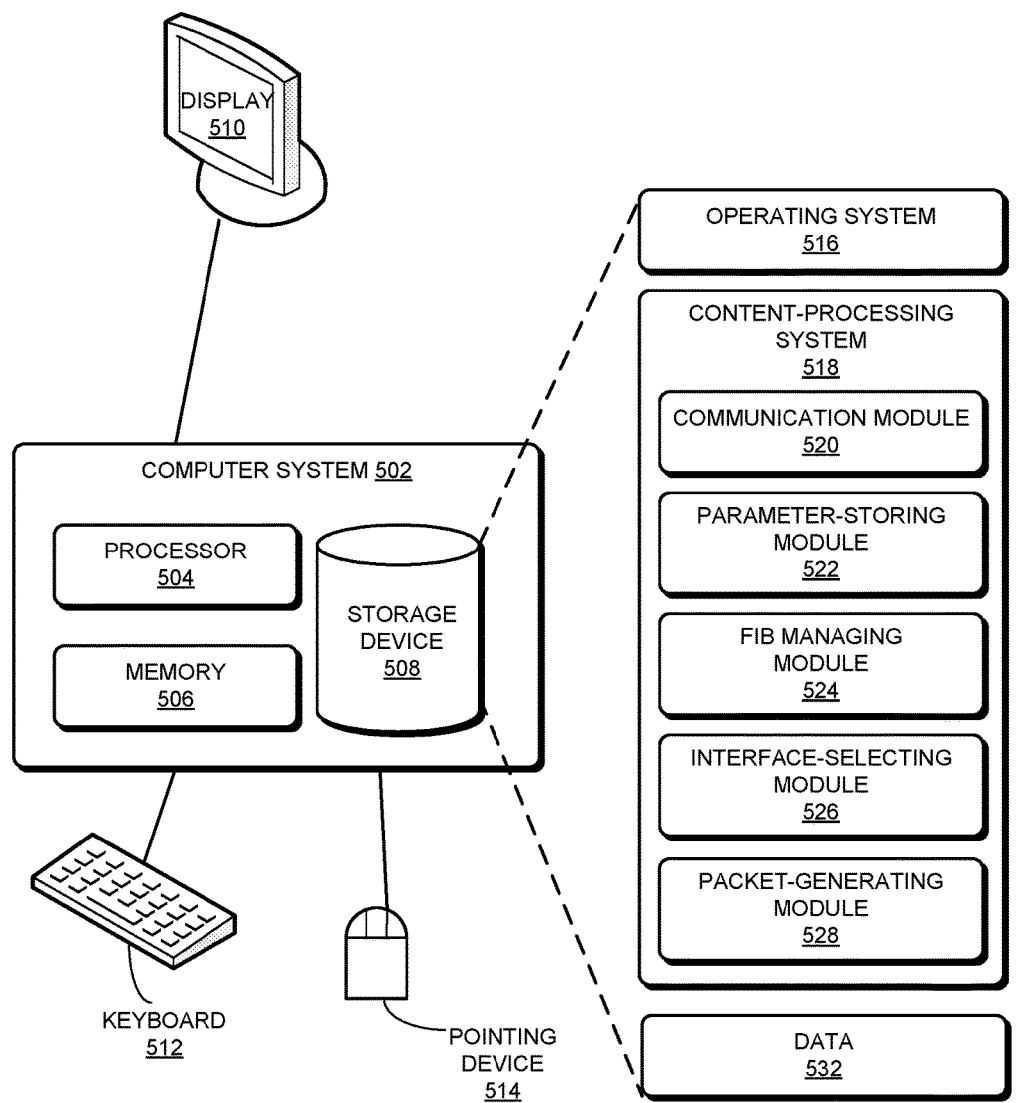
FIG. 5 illustrates an exemplary computer system that facilitates optimal routing decisions based on device-specific parameters, in accordance with an embodiment of the present invention.

FIG. 5 illustrates an exemplary computer system 502 that facilitates optimal routing decisions based on device-specific parameters, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 532.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network, such as a content centric network (communication module 520). A data packet can include an advertisement, an interest packet, or a content object packet with a name which is an HSVLI that includes contiguous name components ordered from a most general level to a most specific level.

Further, content-processing system 518 can include instructions for receiving, from a transmitting device, an advertisement for a name prefix, wherein the advertisement includes route parameters specific to the transmitting device (communication module 520). Content-processing system 518 can also include instructions for storing the route parameters based on the name prefix and a first interface associated with the transmitting device (parameter-storing module 522). Content-processing system 518 can include instructions for, in response to receiving an interest with a name that includes the name prefix (communication module 520), obtaining a matching entry in a forwarding information base based on the name prefix, wherein the matching entry indicates one or more outgoing interfaces and corresponding route parameters, which include the first interface and the corresponding stored route parameters (FIB-managing module 524).

Content-processing system 518 can further include instructions for selecting a second interface from the outgoing interfaces based on the route parameters for the outgoing interfaces (interface-selecting module 526). Content-processing system 518 can also include instructions for forwarding the interest via the selected second interface (communication module 520). Content-processing system 518 can also include instructions for selecting the second interface based on performing a path selection algorithm based on the route parameters for the outgoing interfaces (interface-selecting module 526).

Content-processing system 518 can additionally include instructions for generating an advertisement for a name prefix, wherein the advertisement includes route parameters which are specific to the computer system (packet-generating module 528). Content-processing system 518 can include instructions for transmitting the advertisement to one or more adjacent computing devices (communication module 520). Content-processing system 518 can also include instructions for receiving, from one of the adjacent computing devices, an interest with a name that includes the name prefix, wherein the interest is transmitted based on route parameters included in the advertisement for the name prefix (communication module 520). Content-processing system 518 can include instructions for transmitting a content object responsive to the interest (communication module 520).

Data 532 can include any data that is required as input or that is generated as output by the methods and/or processes described in this disclosure. Specifically, data 532 can store at least: an interest; an advertisement; a content object; a name; a name that is an HSVLI that includes contiguous name components ordered from a most general level to a most specific level; a routable prefix or a name prefix that indicates one or more contiguous name components beginning from the most general level; route parameters; route parameters specific to a device; a cache or content store (CS); content in a CS; a pending interest table (PIT); a PIT entry; a forwarding information base (FIB); a FIB entry; a FIB entry with a name prefix and tuples comprised of outgoing interfaces and corresponding route parameters; a total capacity; an available capacity; a size of a PIT; a size of a FIB; an indicator of a capacity to participate; a size of a table which tracks labels instead of pending interests; a calculation of a device; a characteristic or policy of a device; an absolute value; a relative value which is agreed upon in a network; a path selection algorithm; a vector or field of route parameters; labeled route parameters; and a predetermined order for route parameters.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating optimal forwarding decisions based on device-specific routing parameters, the system comprising:
    a processor; and
    a storage device storing instructions that when executed by the processor cause the processor to perform a method, the method comprising:
        receiving, from a transmitting device, an advertisement for a name prefix, wherein the advertisement includes route parameters specific to the transmitting device, wherein the route parameters include a size of a pending interest table of the transmitting device or a size of a forwarding information base of the transmitting device, wherein the size of the pending interest table or the size of the forwarding information base is one or more of an absolute value of the size of the pending interest table or the size of the forwarding information base and a relative value of the size of the pending interest table or the size of the forwarding information base, wherein the relative value of the size of the pending interest table or the size of the forwarding information base is agreed upon in a network;
        storing the route parameters based on the name prefix and a first interface associated with the transmitting device;
        in response to receiving an interest with a name that includes the name prefix, obtaining a matching entry in a second forwarding information base based on the name prefix, wherein the matching entry indicates one or more outgoing interfaces and corresponding
    route parameters, which include the first interface and the corresponding stored route parameters;
        selecting a second interface from the outgoing interfaces based on the route parameters for the outgoing interfaces; and
        forwarding the interest via the selected second interface,
        thereby facilitating optimal forwarding decisions based on the route parameters specific to the transmitting device.

2. The computer system of claim 1, wherein the route parameters include one or more of:
    a total capacity of a cache of the transmitting device; and
    an available capacity of the cache of the transmitting device,
    wherein the total capacity and the available capacity are one or more of an absolute value of the total capacity and the available capacity and a relative value of the total capacity and the available capacity, wherein the relative value of the total capacity and the available capacity is agreed upon in a network.

3. The computer system of claim 1, wherein the route parameters include an indicator of a capacity of the transmitting device to participate in processing data packets,
    wherein the indicator is one or more of an absolute value of the capacity of the transmitting device to participate in processing data packets and a relative value of the capacity of the transmitting device to participate in processing data packets, wherein the relative value of the capacity of the transmitting device to participate in processing data packets is agreed upon in a network.

4. The computer system of claim 3, wherein the indicator of the capacity to participate is based on one or more of:
    a size of a table which tracks labels instead of pending interests;
    a lack of a pending interest table;
    a calculation of the transmitting device; and
    a characteristic or policy of the transmitting device.

5. The computer system of claim 1, wherein selecting the second interface is further based on performing a path selection algorithm based on the route parameters for the outgoing interfaces.

6. The computer system of claim 5, wherein the path selection algorithm weights at least one routing parameter more than other routing parameters to select the second interface.

7. The computer system of claim 1, wherein the transmitting device is adjacent to the computer system, wherein the route parameters are stored in the second forwarding information base, and wherein the route parameters are indicated in the advertisement based on one or more of:
    a predetermined order; and
    a label or a field for each of the route parameters.

8. The computer system of claim 7, wherein the route parameters and the first interface are stored as tuples in the second forwarding information base.

9. A computer-implemented method, comprising:
receiving, from a transmitting device, an advertisement for a name prefix, wherein the advertisement includes route parameters specific to the transmitting device, wherein the route parameters include a size of a pending interest table of the transmitting device or a size of a forwarding information base of the transmitting device, wherein the size of the pending interest table or the size of the forwarding information base is one or more of an absolute value of the size of the pending interest table or the size of the forwarding information base and a relative value of the size of the pending interest table or the size of the forwarding information base, wherein the relative value of the size of the pending interest table or the size of the forwarding information base is agreed upon in a network;
storing the route parameters based on the name prefix and a first interface associated with the transmitting device;
in response to receiving an interest with a name that includes the name prefix, obtaining a matching entry in a second forwarding information base based on the name prefix, wherein the matching entry indicates one or more outgoing interfaces and corresponding route parameters, which include the first interface and the corresponding stored route parameters;
selecting a second interface from the outgoing interfaces based on the route parameters for the outgoing interfaces; and
forwarding the interest via the selected second interface,
thereby facilitating optimal forwarding decisions based on the route parameters specific to the transmitting device.

10. The method of claim 9, wherein the route parameters include one or more of:
a total capacity of a cache of the transmitting device; and
an available capacity of the cache of the transmitting device,
wherein the total capacity and the available capacity are one or more of an absolute value of the total capacity and the available capacity and a relative value of the total capacity and the available capacity, wherein the relative value of the total capacity and the available capacity is agreed upon in a network.

11. The method of claim 9, wherein the route parameters include an indicator of a capacity of the transmitting device to participate in processing data packets,
wherein the indicator is one or more of an absolute value of the capacity of the transmitting device to participate in processing data packets and a relative value of the capacity of the transmitting device to participate in processing data packets, wherein the relative value of the capacity of the transmitting device to participate in processing data packets is agreed upon in a network.

12. The method of claim 11, wherein the indicator of the capacity to participate is based on one or more of:
a size of a table which tracks labels instead of pending interests;
a lack of a pending interest table;
a calculation of the transmitting device; and
a characteristic or policy of the transmitting device.

13. The method of claim 9, wherein selecting the second interface is further based on performing a path selection algorithm based on the route parameters for the outgoing interfaces.

14. The method of claim 13, wherein the path selection algorithm weights at least one routing parameter more than other routing parameters to select the second interface.

15. The method of claim 9, wherein the transmitting device is adjacent to the computer system, wherein the route parameters are stored in the second forwarding information base, and wherein the route parameters are indicated in the advertisement based on one or more of:
a predetermined order; and
a label or a field for each of the route parameters.

16. The method of claim 15, wherein the route parameters and the first interface are stored as tuples in the second forwarding information base.

17. A computer system for facilitating optimal forwarding decisions based on device-specific routing parameters, the system comprising:
a processor; and
a storage device storing instructions that when executed by the processor cause the processor to perform a method, the method comprising:
generating an advertisement for a name prefix, wherein the advertisement includes route parameters which are specific to the computer system, wherein the route parameters include a size of a pending interest table of the computer system or a size of a forwarding information base of the computer system, wherein the size of the pending interest table or the forwarding information base is one or more of an absolute value of the size of the pending interest table or the size of the forwarding information base and a relative value of the size of the pending interest table or the size of the forwarding information base, wherein the relative value of the size of the pending interest table or the size of the forwarding information base is agreed upon in a network;
transmitting the advertisement to one or more adjacent computing devices;
receiving, from one of the adjacent computing devices, an interest with a name that includes the name prefix, wherein the interest is transmitted based on route parameters included in the advertisement for the name prefix; and
transmitting a content object responsive to the interest, thereby facilitating optimal forwarding decisions based on the routing parameters specific to the computer system.

18. The computer system of claim 17, wherein the route parameters include one or more of:
a total capacity of a cache of the computer system; and
an available capacity of the cache of the computer system,
wherein the total capacity and the available capacity are one or more of an absolute value of the total capacity and the available capacity and a relative value of the total capacity and the available capacity, wherein the relative value of the total capacity and the available capacity is agreed upon in a network.

19. The computer system of claim 17, wherein the route parameters include an indicator of a capacity of the computer system to participate in processing data packets,
wherein the indicator is one or more of an absolute value of the capacity of the computer system to participate in processing data packets and a relative value of the capacity of the computer system to participate in processing data packets, wherein the relative value of the capacity of the computer system to participate in processing data packets is agreed upon in a network.

20. The computer system of claim 17, wherein the route parameters are indicated in the advertisement based on one or more of:
 a predetermined order; and
 a label or a field for each of the route parameters.

* * * * *